US 8,740,245 B2

(12) United States Patent
Fukawatase et al.

(10) Patent No.: US 8,740,245 B2
(45) Date of Patent: Jun. 3, 2014

(54) INFLATOR AND AIRBAG DEVICE

(75) Inventors: Osamu Fukawatase, Miyoshi (JP);
Yusuke Fujiwara, Okazaki (JP)

(73) Assignee: Toyota Jidosha Kabushiki Kaisha,
Toyota (JP)

( * ) Notice: Subject to any disclaimer, the term of this patent is extended or adjusted under 35 U.S.C. 154(b) by 0 days.

(21) Appl. No.: 13/821,040

(22) PCT Filed: May 12, 2011

(86) PCT No.: PCT/JP2011/061000
§ 371 (c)(1),
(2), (4) Date: Mar. 6, 2013

(87) PCT Pub. No.: WO2012/153427
PCT Pub. Date: Nov. 15, 2012

(65) Prior Publication Data
US 2014/0054881 A1    Feb. 27, 2014

(51) Int. Cl.
*B60R 21/264* (2006.01)
*B60R 21/26* (2011.01)

(52) U.S. Cl.
CPC ........... *B60R 21/264* (2013.01); *B60R 21/2644* (2013.01); *B60R 21/26* (2013.01)
USPC .......................................... 280/741; 280/736

(58) Field of Classification Search
CPC .......................... B60R 21/264; B60R 21/2644
USPC ................................................ 780/741, 736
See application file for complete search history.

(56) References Cited

U.S. PATENT DOCUMENTS

| 6,199,906 | B1 * | 3/2001 | Trevillyan et al. ............. 280/741 |
| 6,364,354 | B1 * | 4/2002 | Nakashima et al. .......... 280/736 |
| 6,422,601 | B1 * | 7/2002 | Quioc ........................... 280/741 |
| 6,474,684 | B1 * | 11/2002 | Ludwig et al. ................. 280/741 |
| 6,659,500 | B2 * | 12/2003 | Whang et al. ................. 280/741 |
| 6,929,284 | B1 * | 8/2005 | Saso et al. ..................... 280/741 |
| 6,983,956 | B2 * | 1/2006 | Canterberry et al. ......... 280/741 |

(Continued)

FOREIGN PATENT DOCUMENTS

| CN | 1642791 A | 7/2005 |
| JP | A-11-059318 | 3/1999 |

(Continued)

OTHER PUBLICATIONS

Chinese Office Action issued in Chinese Patent Application No. 201180046108.9 dated Mar. 6, 2014 (w/ translation).

*Primary Examiner* — Nicole Verley
(74) *Attorney, Agent, or Firm* — Oliff PLC

(57) ABSTRACT

An inflator includes: an inflator case configured from a bottomed cylindrical upper case and lower case, with the inflator case having an upper combustion chamber and a lower combustion chamber in which gas generants are accommodated, the upper combustion chamber and the lower combustion chamber being partitioned by a partition wall, and with the inflator case having a peripheral wall in which upper gas discharge holes and lower gas discharge holes are formed; a first inner cylinder member in which a transfer charge for combusting the gas generant inside the lower combustion chamber is accommodated; a second inner cylinder member whose upper end portion penetrates the partition wall and is positioned in a lower portion of the upper combustion chamber, with a transfer charge for combusting the gas generant inside the upper combustion chamber being accommodated inside the second inner cylinder member; a first igniter and a second igniter.

7 Claims, 8 Drawing Sheets

(56) References Cited

U.S. PATENT DOCUMENTS

| | | |
|---|---|---|
| 7,950,693 B2 * | 5/2011 | Jackson et al. ............... 280/741 |
| 8,240,709 B1 * | 8/2012 | Quioc ........................... 280/741 |
| 8,556,294 B1 * | 10/2013 | Norman, III ................. 280/741 |
| 2002/0135172 A1 * | 9/2002 | Koga ............................ 280/741 |
| 2003/0132623 A1 * | 7/2003 | Iwai et al. .................... 280/736 |
| 2003/0137138 A1 * | 7/2003 | Nakashima et al. .......... 280/741 |
| 2004/0046373 A1 * | 3/2004 | Wang et al. ................... 280/741 |
| 2004/0075258 A1 * | 4/2004 | Kubo et al. ................... 280/735 |
| 2005/0225064 A1 * | 10/2005 | Suehiro et al. ................ 280/741 |
| 2007/0057496 A1 * | 3/2007 | Matsuda et al. .............. 280/737 |
| 2008/0211215 A1 * | 9/2008 | Hoffman et al. ............. 280/736 |
| 2011/0101662 A1 * | 5/2011 | Rose et al. .................... 280/741 |
| 2011/0253000 A1 * | 10/2011 | Kobayashi et al. ........... 102/531 |

FOREIGN PATENT DOCUMENTS

| | | |
|---|---|---|
| JP | A-2001-354105 | 12/2001 |
| JP | A-2002-274316 | 9/2002 |
| JP | A-2002-544035 | 12/2002 |
| JP | A-2003-089339 | 3/2003 |
| JP | A-2003-516891 | 5/2003 |
| JP | A-2010-163043 | 7/2010 |
| JP | A-2010-163044 | 7/2010 |
| WO | WO 02/083464 A1 | 10/2002 |
| WO | WO 03/066390 A1 | 8/2003 |
| WO | WO 2010/082683 A1 | 7/2010 |

* cited by examiner

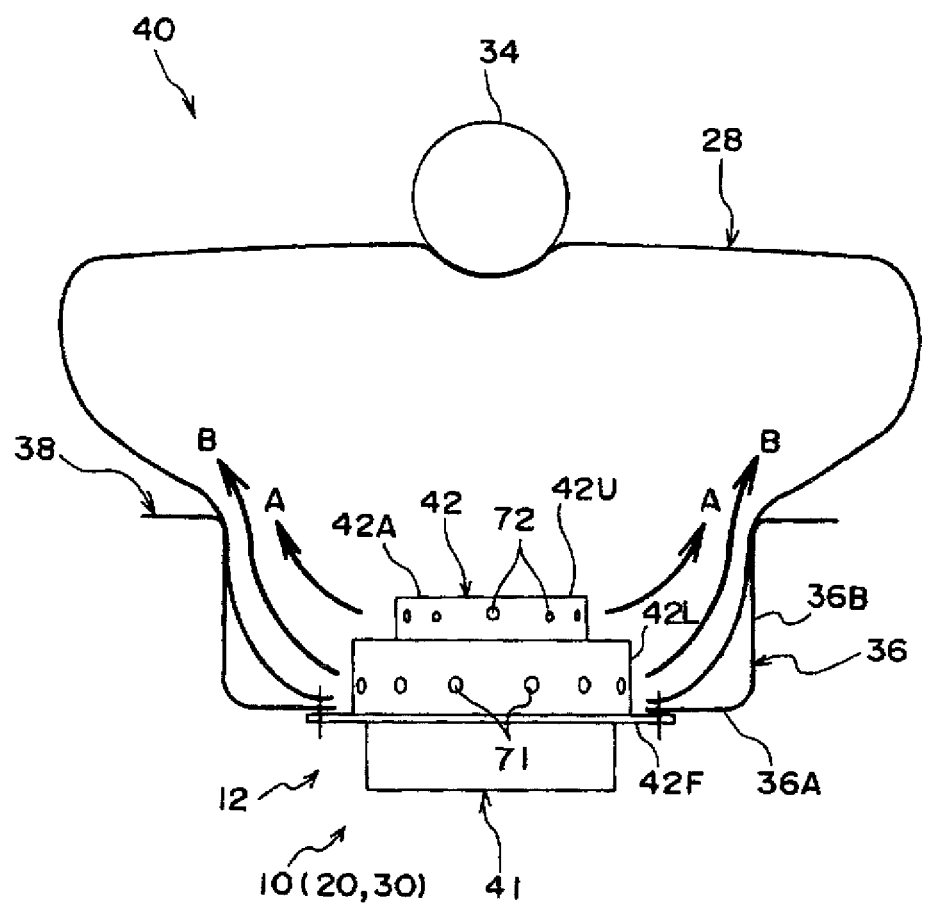

US 8,740,245 B2

INFLATOR AND AIRBAG DEVICE

TECHNICAL FIELD

The present invention relates to an inflator and an airbag device.

BACKGROUND ART

As a disc-type, multistage airbag-use gas generator, a structure has been disclosed where the inside of a cylindrical housing having gas outlets is partitioned by a partition wall into plural combustion chambers disposed side-by-side in the axial direction of the cylindrical housing. Inside the cylindrical housing, inner cylinder members having peripheral walls in which plural flash holes are disposed and inside spaces in which igniting means are accommodated are disposed penetrating the partition wall and are welded to a bottom wall of a diffuser shell and to a closure shell (see patent document 1).

PRIOR ART DOCUMENTS

Patent Documents

Patent Document 1: Japanese Patent Application Laid-Open (JP-A) No. 2001-354105

SUMMARY OF INVENTION

Technical Problem

However, in the conventional example described above, the two inner cylinder members are disposed penetrating not only the plural combustion chambers on the lower side but also the combustion chamber on the upper side, and in correspondence thereto the quantity of gas generant accommodated inside the combustion chamber on the upper side is limited.

In consideration of the above-described circumstances, it is an object of the present invention to reduce the size of a disc-type, two-stage output inflator.

Solution to Problem

A first aspect of the present invention is an inflator including: an inflator case that is configured from a bottomed cylindrical upper case and a bottomed cylindrical lower case that closes an opening in an end portion of the upper case, with the inflator case having an upper combustion chamber, in which a gas generant that generates gas by combustion is accommodated and which is positioned on the upper case side, and a lower combustion chamber, in which a gas generant that generates gas by combustion is accommodated and which is positioned on the lower case side, the upper combustion chamber and the lower combustion chamber being partitioned by a partition wall, and with the inflator case having a peripheral wall in which a plurality of upper gas discharge holes corresponding to the upper combustion chamber and a plurality of lower gas discharge holes corresponding to the lower combustion chamber are formed; a first inner cylinder member that is disposed on a bottom wall portion side of the lower case inside the inflator case, with flash holes communicated with the lower combustion chamber being formed in the first inner cylinder member, and with a transfer charge for combusting the gas generant inside the lower combustion chamber being accommodated inside the first inner cylinder member; a second inner cylinder member that is disposed on the bottom wall portion side of the lower case inside the inflator case, the second inner cylinder member having an upper end portion that penetrates the partition wall and is positioned in a lower portion of the upper combustion chamber, with flash holes communicated with the upper combustion chamber being formed in the upper end portion, and with a transfer charge for combusting the gas generant inside the upper combustion chamber being accommodated inside the second inner cylinder member; a first igniter that is disposed on the bottom wall portion side of the lower case and is configured to be capable of igniting the transfer charge inside the first inner cylinder member; and a second igniter that is disposed on the bottom wall portion side of the lower case and is configured to be capable of igniting the transfer charge inside the second inner cylinder member.

In the inflator pertaining to the first aspect, when the first igniter is actuated, the transfer charge inside the first inner cylinder member is ignited, and when the combustion of the transfer charge propagates into the lower combustion chamber through the flash holes in the first inner cylinder member, the gas generant accommodated inside the lower combustion chamber combusts and high-temperature high-pressure gas is generated. This gas is discharged to the outside from the plural lower gas discharge holes formed in the peripheral wall of the inflator case.

Further, when the second igniter is actuated, the transfer charge inside the second inner cylinder member is ignited, and when the combustion of the transfer charge propagates into the upper combustion chamber through the flash holes in the upper end of the second inner cylinder member, the gas generant accommodated inside the upper combustion chamber combusts and high-temperature high-pressure gas is generated. At that time, the combustion in the upper combustion chamber does not propagate to the lower combustion chamber. Additionally, the gas generated in the upper combustion chamber is discharged to the outside of the inflator case from the plural upper gas discharge holes formed in the peripheral wall of the inflator case.

Consequently, by appropriately controlling the actuation of the first igniter and the actuation of the second igniter, the output can be made into a two-stage output. Further, the upper end portion of the second inner cylinder member communicated with the upper combustion chamber is positioned in the lower portion of the upper combustion chamber and does not penetrate the upper combustion chamber, so the inflator case can be further reduced in size while maintaining the quantity of gas generant accommodated inside the upper combustion chamber—that is, the output of the upper combustion chamber. For this reason, it becomes possible to reduce the size of the disc-type, two-stage output inflator.

A second aspect of the present invention is the inflator of the first aspect, wherein the inflator is provided with a configuration that has an upper cooling space, which is disposed adjacent to the upper combustion chamber on the inner side of the inflator case and is communicated with the upper combustion chamber, and an upper gas flow path, which is communicated with the upper cooling space and is communicated with the upper gas discharge holes, and that does not use a filter for cooling and filtration with respect to the gas generated inside the upper combustion chamber.

In the inflator pertaining to the second aspect, the gas generated in the upper combustion chamber by the actuation of the second igniter travels through the upper cooling space adjacent to the upper combustion chamber and the upper gas flow path and is discharged to the outside of the inflator case from the upper gas discharge holes. At this time, the high-temperature gas is cooled by heat exchange with the inflator case. Further, combustion residue included in the gas is efficiently removed before it reaches the gas discharge holes because it adheres to wall portions and so forth of the upper cooling space and the upper gas flow path due to flow resistance when it passes through the upper cooling space and the upper gas flow path. Because of this, a filter for cooling and filtration whose mass and volume are large can be done away with in regard to the upper combustion chamber, and it becomes possible to reduce the size and weight of the inflator.

A third aspect of the present invention is the inflator of the first aspect, wherein the inflator is provided with a configuration that has a lower cooling space, which is disposed adjacent to the lower combustion chamber on the inner side of the inflator case and is communicated with the lower combustion chamber, and a lower gas flow path, which is communicated with the lower cooling space and is communicated with the lower gas discharge holes, and that does not use a filter for cooling and filtration with respect to the gas generated inside the lower combustion chamber.

In the inflator pertaining to the third aspect, the gas generated in the lower combustion chamber by the actuation of the first igniter travels through the lower cooling space adjacent to the lower combustion chamber and the lower gas flow path and is discharged to the outside of the inflator case from the lower gas discharge holes. At this time, the high-temperature gas is cooled by heat exchange with the inflator case. Further, combustion residue included in the gas is efficiently removed before it reaches the gas discharge holes because it adheres to wall portions and the like of the lower cooling space and the lower gas flow path due to flow resistance when it passes through the lower cooling space and the lower gas flow path. Because of this, a filter for cooling and filtration whose mass and volume are large can be done away with in regard to the lower combustion chamber, and it becomes possible to reduce the size and weight of the inflator.

A fourth aspect of the present invention is the inflator pertaining to any one of the first aspect to the third aspect, wherein the upper combustion chamber is set to a lower output than the lower combustion chamber.

In the inflator pertaining to the fourth aspect, the upper combustion chamber is set to a lower output than the lower combustion chamber, so the quantity of gas discharged from the upper combustion chamber can be suppressed compared to a case where the output of the upper combustion chamber and the output of the lower combustion chamber are equal.

A fifth aspect of the present invention is the inflator pertaining to the fourth aspect, wherein the upper gas discharge holes are offset toward the bottom wall portion side of the upper case with respect to a central position of the upper combustion chamber in an axial direction of the inflator case.

In the inflator pertaining to the fifth aspect, the upper gas discharge holes are offset toward the bottom wall portion side of the upper case with respect to the central position of the upper combustion chamber in the axial direction of the inflator case, so the gas generated in the upper combustion chamber is discharged outward in the radial direction of the inflator case from positions near the bottom wall portion of the upper case. Consequently, in the case of using the inflator for inflating and deploying an airbag, it becomes easier to inflate and deploy the airbag in its radial direction by placing the upper case on a vehicle occupant side and discharging the gas from the upper gas discharge holes.

A sixth aspect of the present invention is the inflator pertaining to the fourth aspect of the fifth aspect, wherein the outer diameter of the site of the peripheral wall of the inflator case where the upper gas discharge holes are formed is smaller than the outer diameter of the site of the peripheral wall of the inflator case where the lower gas discharge holes are formed.

In the inflator pertaining to the sixth aspect, in the case of using the inflator for inflating and deploying an airbag, in a state where the inflator is attached to a module case together with the airbag in a folded state, more distance can be ensured from the upper gas discharge holes to a side wall portion of the module case. Because of this, the flow of the gas discharged from the upper gas discharge holes heads outward in a radial direction of the airbag without being impeded much by the side wall portion. For this reason, it becomes easier to inflate and deploy the airbag in its radial direction.

A seventh aspect of the present invention is an airbag device including: the inflator according to any one of claim 4 to claim 6 where the upper case is placed on a vehicle occupant side; and an airbag that is normally folded and stored and is supplied with the gas from the inflator to thereby inflate and deploy in front of the vehicle occupant, wherein the airbag device is configured in such a way that the second igniter is actuated when the vehicle occupant is in a state close to a storage position of the airbag.

In the airbag device pertaining to the seventh aspect, the second igniter is actuated when the vehicle occupant is in the state close to the storage position of the airbag, whereby gas is generated in the upper combustion chamber of the inflator. The upper combustion chamber is set to a lower output than the lower combustion chamber, so the load on the vehicle occupant resulting from the airbag can be alleviated.

Advantageous Effects of Invention

As described above, according to the inflator pertaining to the first aspect, there is obtained the excellent effect that it becomes possible to reduce the size of the disc-type, two-stage output inflator.

According to the inflator pertaining to the second aspect, there is obtained the excellent effect that a filter for cooling and filtration whose mass and volume are large can be done away with in regard to the upper combustion chamber, and it becomes possible to reduce the size and weight of the inflator.

According to the inflator pertaining to the third aspect, there is obtained the excellent effect that a filter for cooling and filtration whose mass and volume are large can be done away with in regard to the lower combustion chamber, and it becomes possible to reduce the size and weight of the inflator.

According to the inflator pertaining to the fourth aspect, there is obtained the excellent effect that the quantity of gas discharged from the upper combustion chamber can be suppressed compared to a case where the output of the upper combustion chamber and the output of the lower combustion chamber are equal.

According to the inflators pertaining to the fifth and sixth aspects, there is obtained the excellent effect that, in the case of using the inflator for inflating and deploying an airbag, it becomes easier to inflate and deploy the airbag in its radial direction.

According to the airbag device pertaining to the seventh aspect, there is obtained the excellent effect that the load on the vehicle occupant resulting from the airbag can be alleviated.

BRIEF DESCRIPTION OF DRAWINGS

FIG. 9 is a sectional view showing the inflated and deployed state of the airbag in a state where the vehicle occupant is not close.

DESCRIPTION OF EMBODIMENTS

Embodiments of the present invention will be described below on the basis of the drawings. First, inflators 10, 20, and 30 pertaining to first to third embodiments will be described, and next an airbag device 40 using any of the inflators 10, 20, and 30 will be described.

First Embodiment

Figure 1:
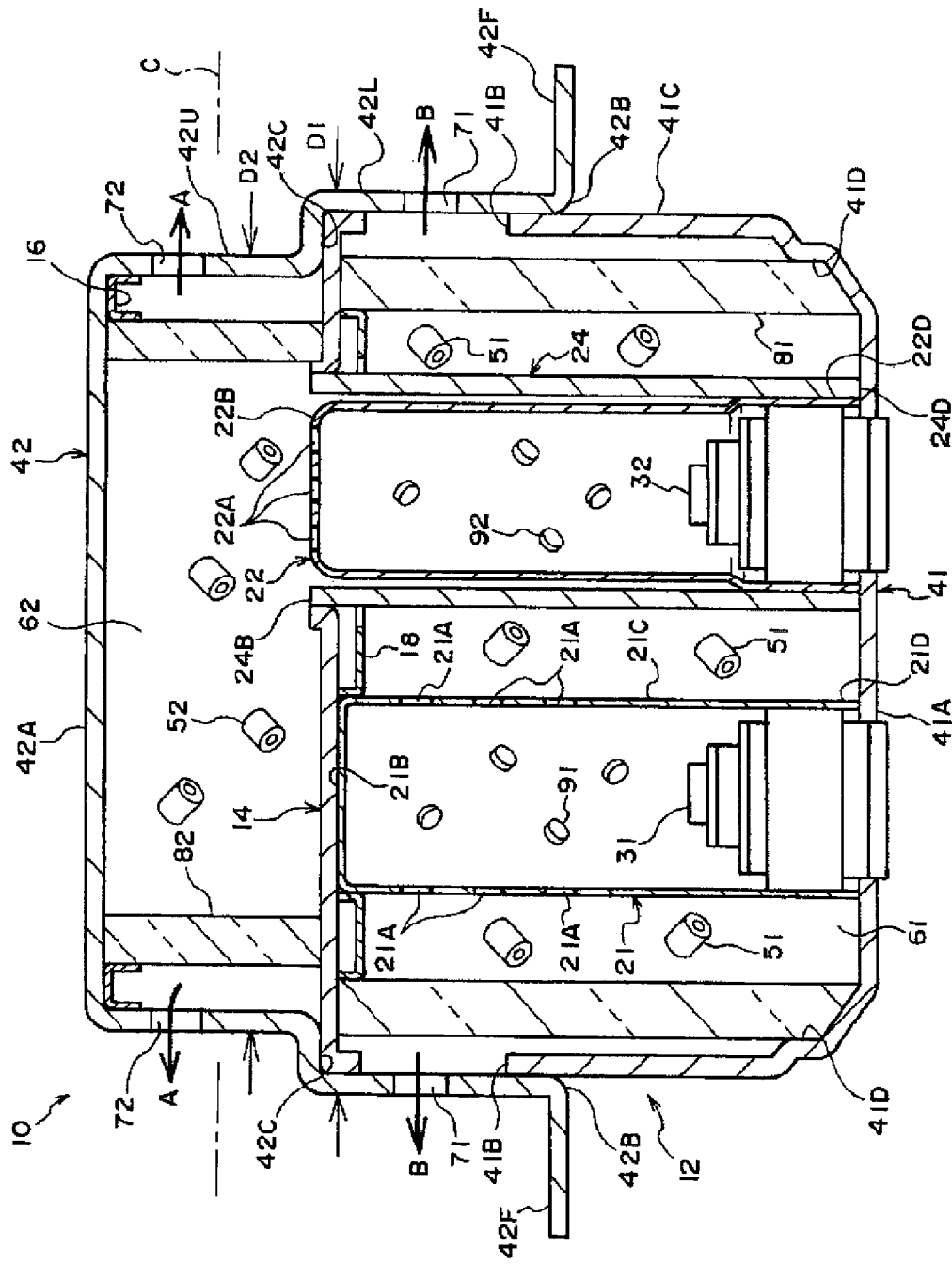
FIG. 1 is a longitudinal sectional view showing an inflator pertaining to a first embodiment.
Figure 2:
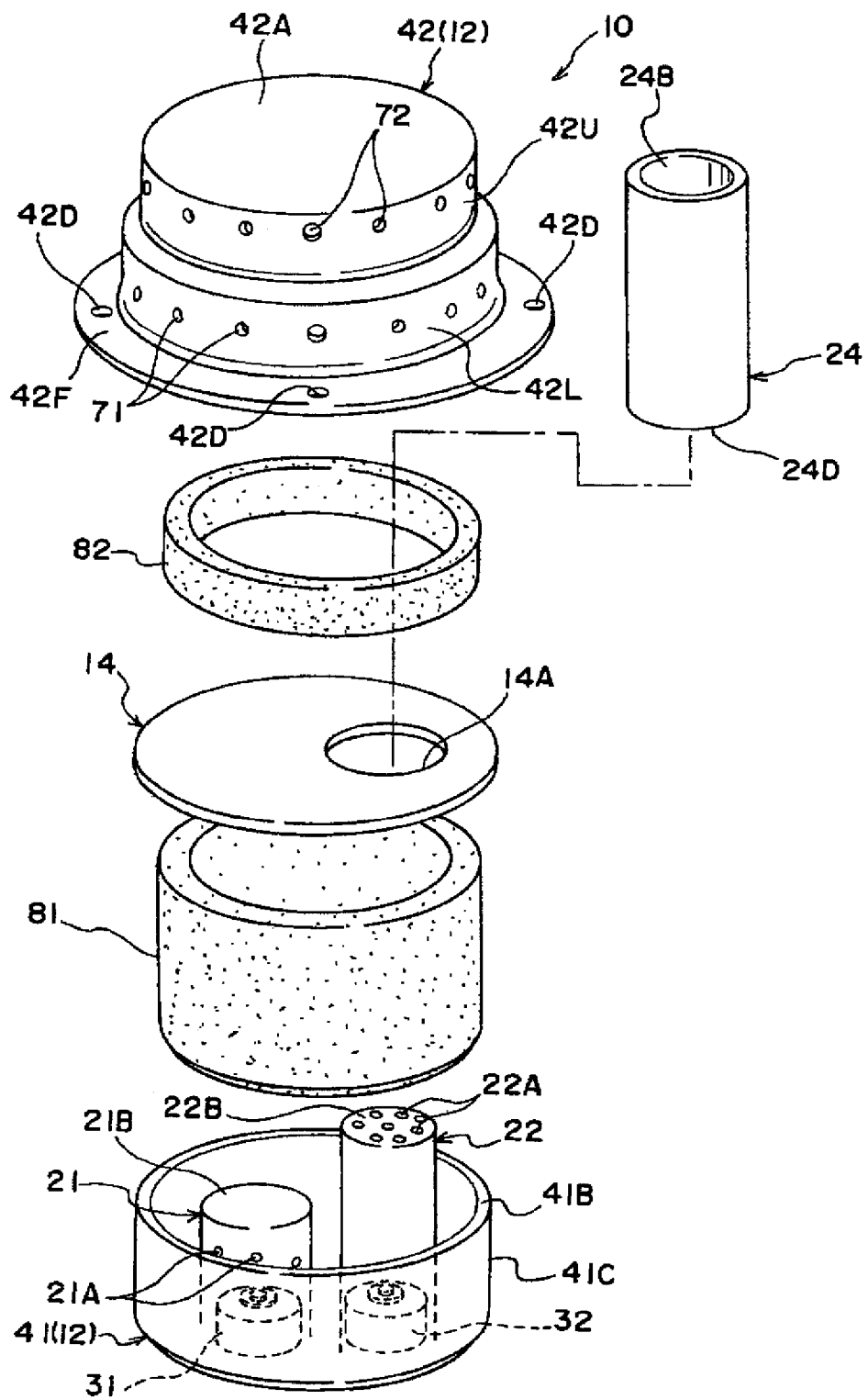
FIG. 2 is an exploded perspective view showing the inflator pertaining to the first embodiment.

In FIG. 1 and FIG. 2, the inflator 10 is a disc-type, two-stage output gas generator and has an inflator case 12, a first inner cylinder member 21, a second inner cylinder member 22, a first igniter 31, and a second igniter 32.

The inflator case 12 is configured from a bottomed cylindrical upper case 42 and a bottomed cylindrical lower case 41 that closes an opening in an end portion 42B of the upper case 42, and an upper combustion chamber 62 and a lower combustion chamber 61 are partitioned by a partition wall 14.

An end portion 41B on an open side of a peripheral wall 41C of the lower case 41 is inserted into the inner side of a peripheral wall 42L of the upper case 42, and in this state the upper case 42 and the lower case 41 are welded together. Because of this, the disc-type inflator case 12 is formed.

A gas generant 52 that generates gas by combustion is accommodated in the upper combustion chamber 62. The upper combustion chamber 62 is positioned on the upper case 42 side. Further, a gas generant 51 that generates gas by combustion is accommodated in the lower combustion chamber 61. The lower combustion chamber 61 is positioned on the lower case 41 side. Here, "the upper combustion chamber 62 is positioned on the upper case 42 side" means that the upper combustion chamber 62 is positioned on a bottom wall portion 42A side of the upper case 42. Further, "the lower combustion chamber 61 is positioned on the lower case 41 side" means that the lower combustion chamber 61 is positioned on a bottom wall portion 41A side of the lower case 41. Consequently, as shown in the drawings, the configuration may be such that part of the lower combustion chamber 61 is positioned inside the upper case 42.

Plural upper gas discharge holes 72 corresponding to the upper combustion chamber 62 are formed in the inflator case 12 such as, for example, in a peripheral wall 42U of the upper case 42. The upper gas discharge holes 72 are offset toward the bottom wall portion 42A side of the upper case 42 with respect to a central position C of the upper combustion chamber 62 in an axial direction of the inflator case 12. Further, plural lower gas discharge holes 71 corresponding to the lower combustion chamber 61 are formed in the peripheral wall 42L of the upper case 42.

An outer diameter D2 of the site (the peripheral wall 42U of the upper case 42) of the peripheral wall of the inflator case 12 where the upper gas discharge holes 72 are formed is configured to be smaller than an outer diameter D1 of the site (the peripheral wall 42L of the upper case 42) of the peripheral wall of the inflator case 12 where the lower gas discharge holes 71 are formed. In other words, the peripheral wall 42U is configured to be as a small diameter portion on the bottom wall portion 42A side of the upper case 42, and the peripheral wall 42L is configured to be a large diameter portion on the end portion 42B side of the upper case 42.

A step portion 42C is formed at the boundary between the peripheral walls 42U and 42L of the upper case 42. The partition wall 14 that partitions the upper combustion chamber 62 and the lower combustion chamber 61 is placed in the position of the step portion 42C.

The upper combustion chamber 62 is set to a lower output than the lower combustion chamber 61. Specifically, the gas generant 52 accommodated in the upper combustion chamber 62 is set to be smaller in quantity than the gas generant 51 accommodated in the lower combustion chamber 61.

In other words, the upper case 42 is configured to have a stepped shape, with the peripheral wall 42U on the bottom wall portion 42A side serving as the small diameter portion and the peripheral wall 42L on the open side of the end portion 42B serving as the large diameter portion. A flange 42F that projects outward in a radial direction of the upper case 42 is disposed on the end portion 42B. As shown in FIG. 2, plural through holes 42D for allowing fixing members such as bolts to pass through are formed in the flange 42F.

The upper combustion chamber 62 is positioned between the bottom wall portion 42A of the upper case 42 and the partition wall 14 inside the inflator case 12 and on the inner side of the peripheral wall 42U. An upper filter 82 that is cylindrical, for example, is disposed around the upper combustion chamber 62. The upper filter 82 is held between the bottom wall portion 42A of the upper case 42 and the partition wall 14. Further, the upper filter 82 is held from its outer peripheral side by a retainer 16. Illustration of the retainer 16 is omitted from FIG. 2 for the sake of simplicity.

Because of this, the outer peripheral surface of the upper filter 82 is spaced all around its periphery from the peripheral wall 42U. The upper filter 82 is a member for cooling the high-temperature gas generated as a result of the gas generant 52 combusting and for filtering the combustion residue.

The lower combustion chamber 61 is positioned between the partition wall 14 and the bottom wall portion 41A of the lower case 41 inside the inflator case 12 and on the inner sides of the peripheral wall 42L of the upper case 42 and the peripheral wall 41C of the lower case 41. A lower filter 81 that is cylindrical, for example, is disposed around the lower combustion chamber 61. The lower filter 81 is held between the partition wall 14 and the bottom wall portion 41A of the lower case 41. The upper end side of the lower filter 81 is held from its inner peripheral side by a retainer 18 placed on the underside of the partition wall 14. A step portion 41D that projects inward in the radial direction is formed on the lower end of the peripheral wall 41C of the lower case 41. The lower end side of the lower filter 81 is held from its outer peripheral side by the step portion 41D. Illustration of the retainer 18 is omitted from FIG. 2 for the sake of simplicity. The same is true in FIG. 4 pertaining to the second embodiment described later.

Because of this, the outer peripheral surface of the lower filter 81 is spaced all around its periphery from the peripheral wall 41C of the lower case 41 and the peripheral wall 42L of the upper case 42. The lower filter 81 is a member for cooling the high-temperature gas generated as a result of the gas generant 51 combusting and for filtering the combustion residue.

The first inner cylinder member 21 is disposed on the bottom wall portion 41A side of the lower case 41 inside the inflator case 12. Plural flash holes 21A communicated with the lower combustion chamber 61 are formed in the peripheral wall 21C, for example, of the first inner cylinder member 21. A transfer charge 91 for combusting the gas generant 51 inside the lower combustion chamber 61 is accommodated in the first inner cylinder member 21.

The basic configuration of the first inner cylinder member 21 is, for example, a bottomed cylinder whose lower end portion 21D is open and whose upper end portion 21B is closed. The lower end portion 21D is welded to the bottom wall portion 41A of the lower case 41. The upper end portion 21B is in contact with the partition wall 14, for example, and is inserted into and held by the retainer 18.

The second inner cylinder member 22 is disposed on the bottom wall portion 41A side of the lower case 41 inside the inflator case 12. An upper end portion 22B of the second inner cylinder member 22 penetrates the partition wall 14 and is positioned in the lower portion of the upper combustion chamber 62, and plural flash holes 22A communicated with the upper combustion chamber 62 are formed in the upper end portion 22B. Further, a transfer charge 92 for combusting the gas generant 52 inside the upper combustion chamber 62 is accommodated in the second inner cylinder member 22.

Here, "the upper end portion 22B of the second inner cylinder member 22 is positioned in the lower portion of the upper combustion chamber 62" means that there is little projection of the upper end portion 22B into the upper combustion chamber 62 or that no such projection exists. Consequently, the second inner cylinder member 22 does not have a configuration where it penetrates the upper combustion chamber 62. In the present embodiment, the upper end portion 22B of the second inner cylinder member 22 penetrates the partition wall 14 and is positioned at a height equal to that of the partition wall 14 (the bottom portion of the upper combustion chamber 62).

The basic configuration of the second inner cylinder member 22 is, for example, a bottomed cylinder whose lower end portion 22D is open and whose upper end portion 22B is closed. The bottom end portion 22D is welded to the bottom wall portion 41A of the lower case 41. A heat-insulating material 24 that is cylindrical, for example, is disposed on the radial direction outer side of the second inner cylinder member 22. The heat-insulating material 24 is a member for suppressing heat transfer between the inside of the second inner cylinder member 22 and the lower combustion chamber 61. An upper end portion 24B of the heat-insulating material 24 is fitted into a through hole 14A (see FIG. 2) in the partition wall 14, and a lower end portion 24D is in contact with the bottom wall portion 41A of the lower case 41.

Considering the heat insulating member 24 as being included with the second inner cylinder member 22, the positions of the flash holes 22A may also be set lower than the partition wall 14 because the lower combustion chamber 61 and the upper combustion chamber 62 are separated from each other by the heat-insulating material 24.

The first igniter 31 is disposed on the bottom wall portion 41A side of the lower case 41 and is configured to be capable of igniting the transfer charge 91 inside the first inner cylinder member 21. The first igniter 31 is inserted into the bottom wall portion 41A of the lower case 41 and is fixed to the bottom wall portion 41A by welding, for example.

The second igniter 32 is disposed on the bottom wall portion 41A side of the lower case 41 and is configured to be capable of igniting the transfer charge 92 inside the second inner cylinder member 22. The second igniter 32 is inserted into the bottom wall portion 41A of the lower case 41 and is fixed to the bottom wall portion 41A by welding, for example.

Actuating currents are independently supplied from an airbag ECU (not shown in the drawings) to the first igniter 31 and the second igniter 32 via a wire harness (not shown in the drawings).

(Operation)

The present embodiment is configured as described above, and the operation thereof will be described below. In FIG. 1, in the inflator 10 pertaining to the present embodiment, when the airbag ECU supplies the actuating current to the first igniter 31 to thereby actuate the first igniter 31, the transfer charge 91 inside the first inner cylinder member 21 is ignited. When the combustion of the transfer charge 91 propagates into the lower combustion chamber 61 through the flash holes 21A in the first inner cylinder member 21, the gas generant 51 accommodated inside the lower combustion chamber 61 combusts and high-temperature high-pressure gas is generated.

The gas is cooled when it passes through the lower filter 81, the combustion residue is filtered therefrom, and the gas is discharged in the direction of arrow B to the outside from the plural lower gas discharge holes 71 formed in the peripheral wall of the inflator case 12 (the peripheral wall 42L of the upper case 42). The direction of arrow B is outward in the radial direction of the inflator case 12, for example.

The combustion of the transfer charge 91 in the first inner cylinder member 21 and the combustion of the gas generant 51 in the lower combustion chamber 61 do not propagate to the transfer charge 92 inside the second inner cylinder member 22 and the gas generant 52 inside the upper combustion chamber 62.

Further, when the airbag ECU supplies the actuating current to the second igniter 32 to thereby actuate the second igniter 32, the transfer charge 92 inside the second inner cylinder member 22 is ignited, and when the combustion of the transfer charge 92 propagates into the upper combustion chamber 62 through the flash holes 22A in the upper end of the second inner cylinder member 22, the gas generant 52 accommodated inside the upper combustion chamber 62 combusts and high-temperature high-pressure gas is generated.

The gas is cooled when it passes through the upper filter 82, the combustion residue is filtered therefrom, and the gas is discharged in the direction of arrow A to the outside of the inflator case 12 from the plural upper gas discharge holes 72 formed in the peripheral wall of the inflator case 12 (the peripheral wall 42U of the upper case 42). The direction of arrow A is outward in the radial direction of the inflator case 12, for example.

The upper gas discharge holes 72 are offset toward the bottom wall portion 42A side of the upper case 42 with respect to the central position C in the axial direction of the inflator case 12, so the gas generated in the upper combustion chamber 62 can be discharged from positions near the bottom wall portion 42A of the upper case 42.

The upper combustion chamber 62 is set to a lower output than the lower combustion chamber 61, so the quantity of gas discharged from the upper combustion chamber 62, can be suppressed compared to a case where the output of the upper combustion chamber 62 and the output of the lower combustion chamber 61 are equal.

The combustion of the transfer charge 92 in the second inner cylinder member 22 and the combustion of the gas generant 52 in the upper combustion chamber 62 do not propagate to the transfer charge 91 inside the first inner cylinder member 21 and the gas generant 51 inside the lower combustion chamber 61.

Consequently, by appropriately controlling the actuation of the first igniter 31 and the actuation of the second igniter 32, the output can be made into a two-stage output. Further, the upper end portion 22B of the second inner cylinder member 22 communicated with the upper combustion chamber 62 is positioned in the lower portion of the upper combustion chamber 62 and does not penetrate the upper combustion chamber 62, so the inflator case 12 can be further reduced in size while maintaining the quantity of the gas generant 52 accommodated in the upper combustion chamber 62 that is, the output of the upper combustion chamber 62. For this reason, it becomes possible to reduce the size of the disc-type, two-stage output inflator 10.

Second Embodiment

Figure 3:
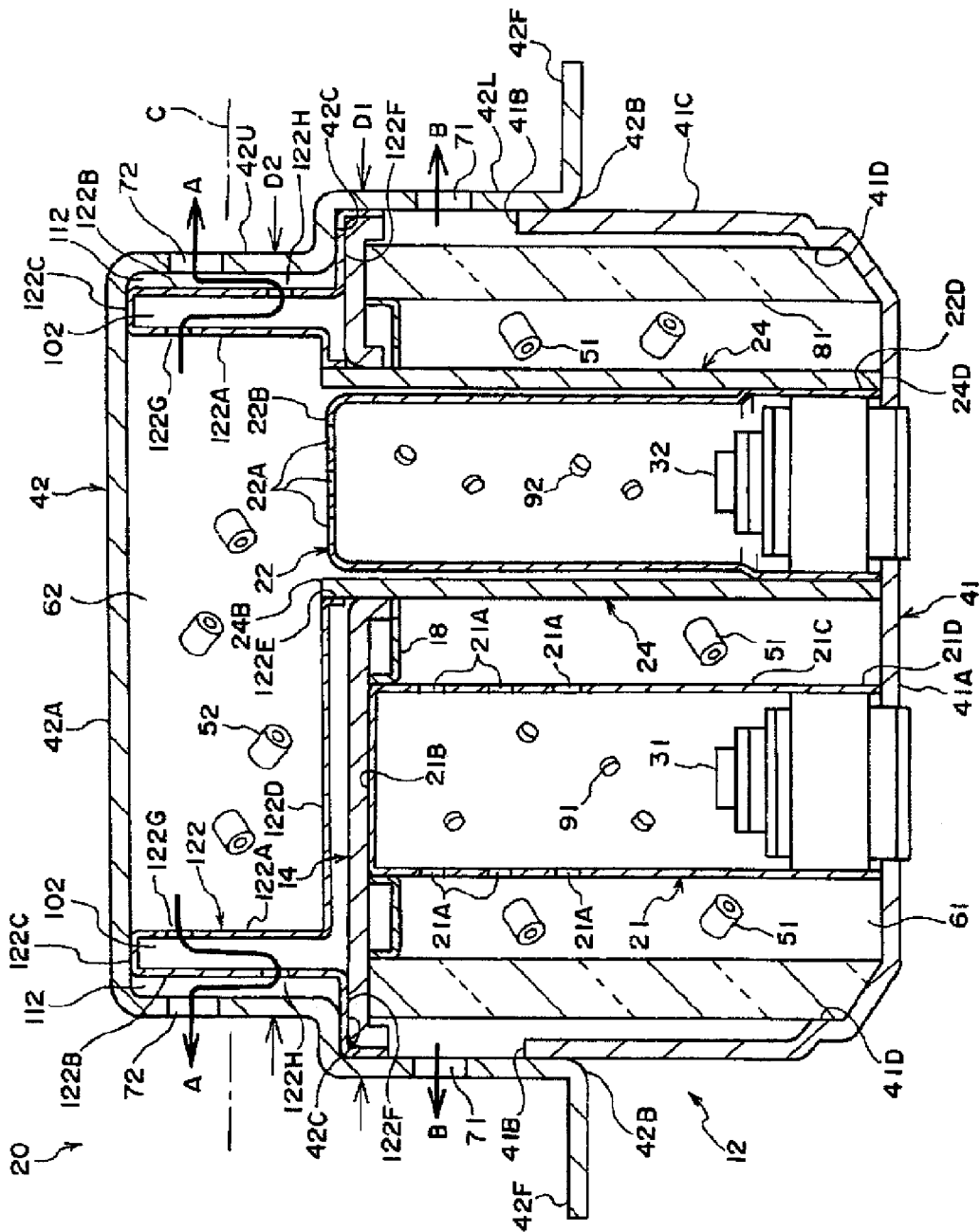
FIG. 3 is a longitudinal sectional view showing an inflator pertaining to a second embodiment.
Figure 4:
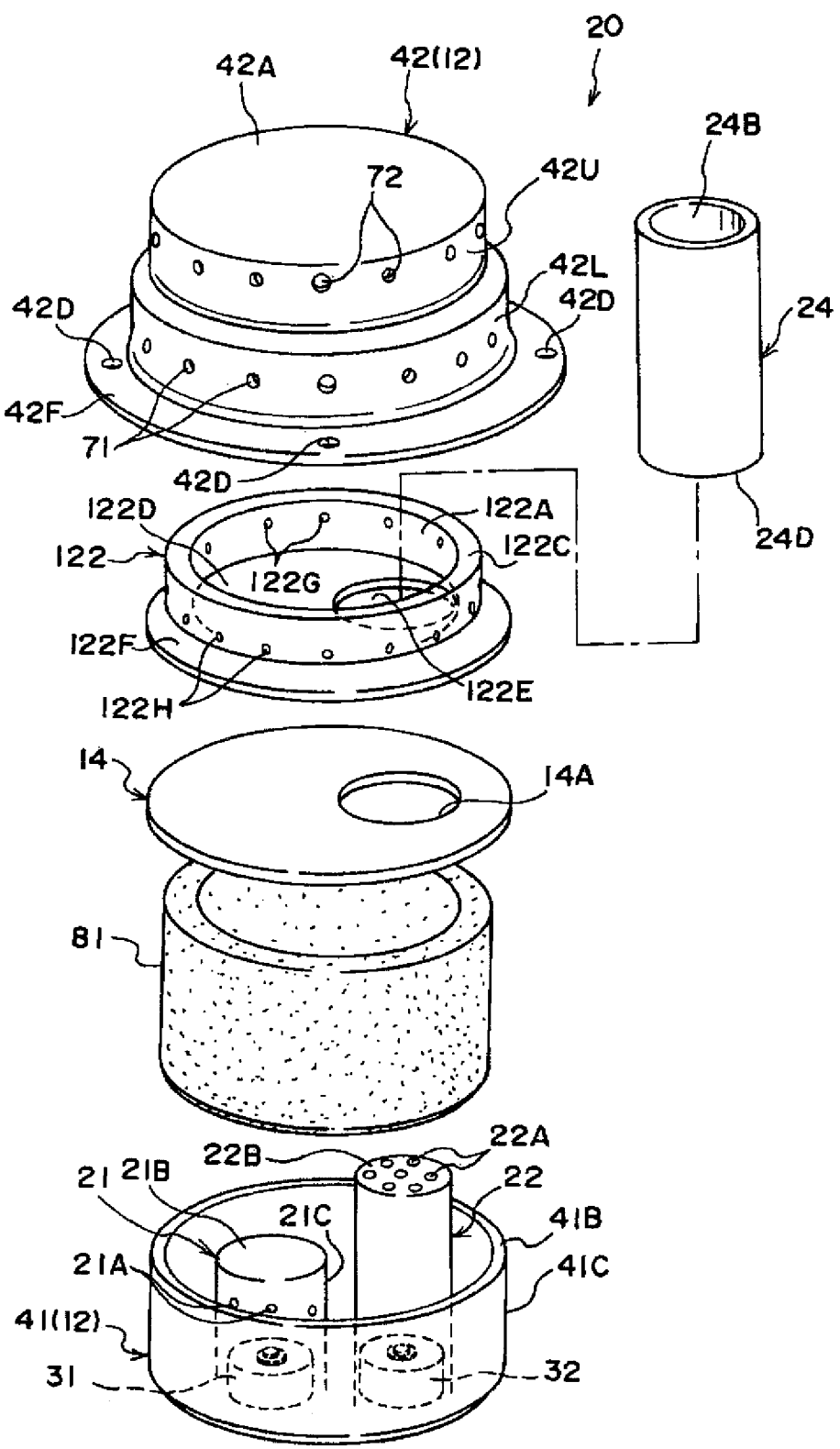
FIG. 4 is an exploded perspective view showing the inflator pertaining to the second embodiment.

In FIGS. 3 and 4, the inflator 20 pertaining to the present embodiment is provided with a configuration that has an upper cooling space 102 and an upper gas flow path 112 and that does not use a filter for cooling and filtration (corresponding to the upper filter 82 in the first embodiment) with respect to the gas generated inside the upper combustion chamber 62.

The upper cooling space 102 is disposed adjacent to the upper combustion chamber 62 on the inner side of the inflator case 12 and is communicated with the upper combustion chamber 62. In the present embodiment, the upper cooling space 102 is disposed in an outer cylinder member 122 that surrounds the outer periphery of the upper combustion chamber 62.

The outer cylinder member 122 is configured by press-forming a metal plate, for example, with the space between its annular inner wall portion 122A and its outer wall portion 122B being configured to serve as the upper cooling space 102 and with the space between its outer wall portion 122B and the peripheral wall 42U of the upper case 42 being configured to serve as the upper gas flow path 112. Plural through holes 122G that allow the upper combustion chamber 62 and the upper cooling space 102 to be communicated with each other are formed in an upper portion of the inner wall portion 122A. Further, plural through holes 122H that allow the upper cooling space 102 and the upper gas flow path 112 to be communicated with each other are formed in a lower portion of the outer wall portion 122B.

The inner wall portion 122A and the outer wall portion 122B are continuous in the radial direction at an upper end portion 122C, for example. The upper end portion 122C is flatly formed and is in contact with the inner surface of the bottom wall portion 42A of the upper case 42. A bottom wall portion 122D is formed on the radial direction inner side of the lower end side of the inner wall portion 122A. The bottom wall portion 122D serves as the bottom portion of the upper combustion chamber 62. Further, a through hole 122E into which the upper end portion 24B of the heat-insulating material 24 is fitted is formed in the bottom wall portion 122D. A flange 122F having a diameter equal to that of the partition wall 14 is formed on the radial direction outer side of the lower end side of the outer wall portion 122B. The flange 122F is held between the partition wall 14 and the step portion 42C of the upper case 42.

The upper gas flow path 112 is communicated with the upper cooling space 102 via the through holes 122H and is communicated with the upper gas discharge holes 72. The upper gas flow path 112 is ensured by making the outer diameter of the outer wall portion 122B of the outer cylinder member 122 smaller than the inner diameter of the peripheral wall 42U of the upper case 42. The upper end side of the upper gas flow path 112 is closed by the bottom wall portion 42A of the upper case 42. Further, the lower end side of the upper gas flow path 112 is closed by the flange 122F of the outer cylinder member 122.

Other portions are the same as those in the first embodiment, so for identical portions, identical reference signs are given in the drawings and description will be omitted.

(Operation)

The present embodiment is configured as described above, and the operation thereof will be described below. In FIG. 3, in the inflator 20 pertaining to the present embodiment, the gas generated in the upper combustion chamber 62 by the actuation of the second igniter 32 flows through the through holes 122G in the inner wall portion 122A of the outer cylinder member 122 and into the upper cooling space 102 adjacent to the upper combustion chamber 62, further flows through the through holes 122H in the outer wall portion 122B of the outer cylinder member 122 and into the upper gas flow path 112, and is discharged in the direction of arrow A to the outside of the inflator case 12 from the upper gas discharge holes 72.

At this time, the high-temperature gas is cooled by heat exchange with the inflator case 12 and the outer cylinder member 122. Further, the combustion residue included in the gas is efficiently removed before it reaches the upper gas discharge holes 72 because it adheres to wall portions and so forth of the upper cooling space 102 and the upper gas flow path 112 due to flow resistance when it passes through the upper cooling space 102 and the upper gas flow path 112. The "wall portions and so forth" are the inner wall portion 122A, the outer wall portion 122B, and the upper end portion 122C of the outer cylinder member 122, the partition wall 14, and the peripheral wall 42U of the upper case 42.

Because of this, a filter for cooling and filtration whose mass and volume are large (the upper filter 82 in the first embodiment) can be done away with in regard to the upper combustion chamber 62, and it becomes possible to reduce the size and weight of the inflator 20.

The flow of the gas generated in the lower combustion chamber 61 is the same as in the first embodiment.

Third Embodiment

Figure 5:
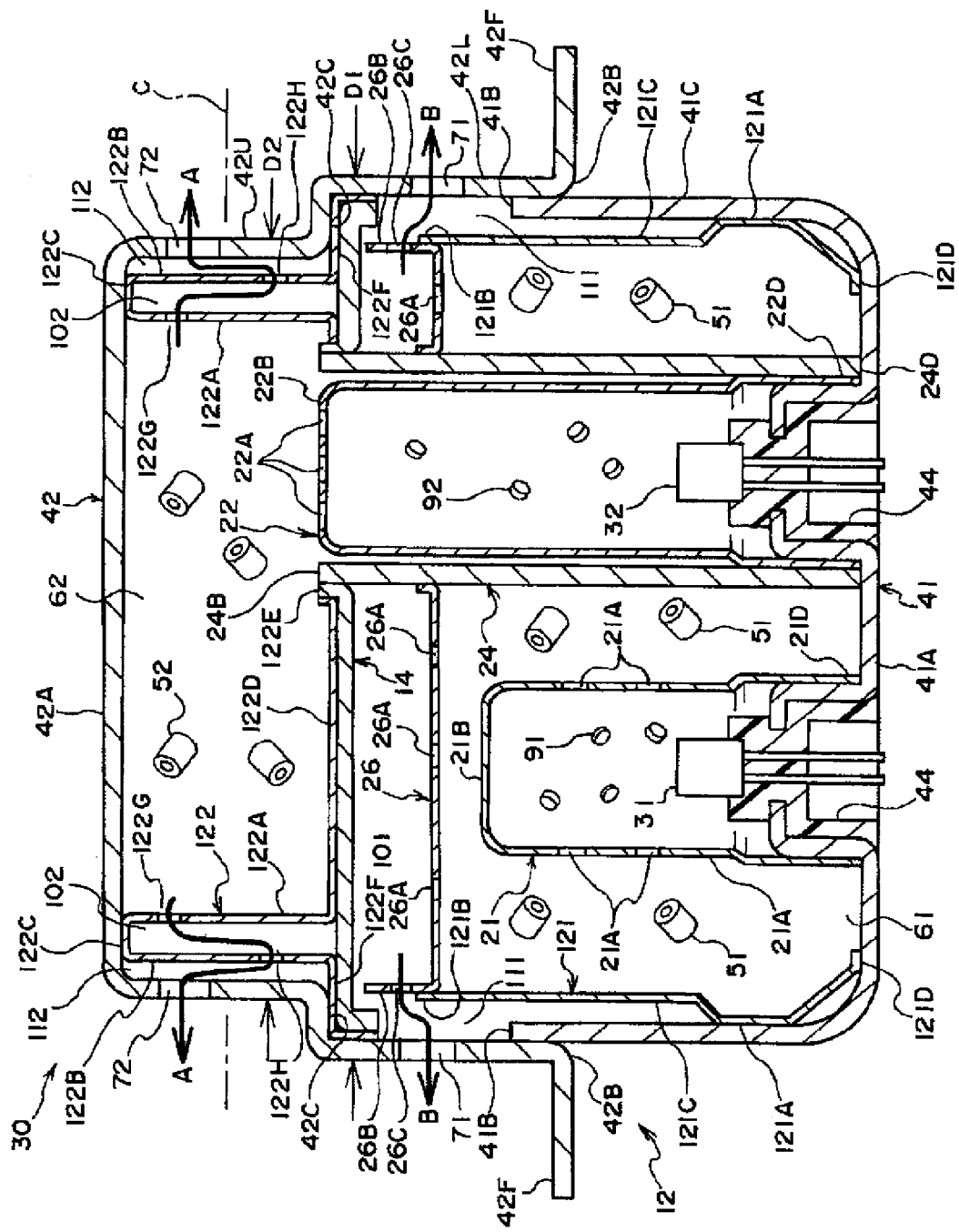
FIG. 5 is a longitudinal sectional view showing an inflator pertaining to a third embodiment.
Figure 6:
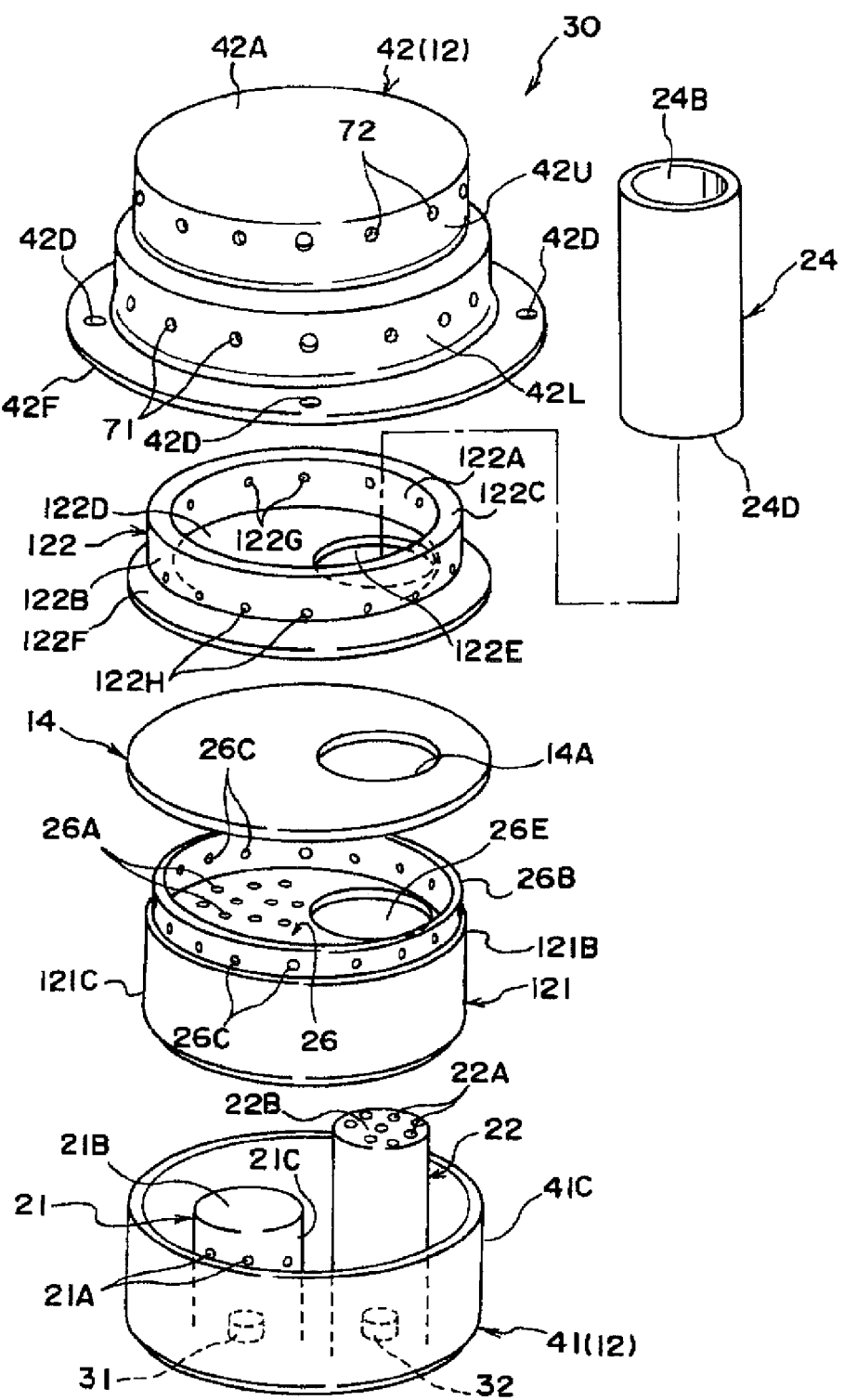
FIG. 6 is an exploded perspective view showing the inflator pertaining to the third embodiment.

In FIG. 5 and FIG. 6, the inflator 30 pertaining to the present embodiment is provided with a configuration that further has, with respect to the inflator 20 pertaining to the second embodiment, a lower cooling space 101 and a lower gas flow path 111 and that does not use a filter for cooling and filtration (corresponding to the lower filter 81 in the first embodiment and the second embodiment) with respect to the gas generated inside the lower combustion chamber 61.

The lower cooling space 101 is disposed adjacent to the lower combustion chamber 61 on the inner side of the inflator case 12 and is communicated with the lower combustion chamber 61. In the present embodiment, the lower cooling space 101 is partitioned by a partition wall 26 and is disposed between the lower combustion chamber 62 and the partition wall 14. The partition wall 26 is press-fitted, for example, into the inner side of an upper end 121B of an outer cylinder member 121 disposed inside the inflator case 12.

Plural through holes 26A, which allow the lower combustion chamber 61 and the lower cooling space 101 to be communicated with each other, and a through hole 26E, through which the second inner cylinder member 22 and the heat-insulating material 24 are passed, are formed in the partition wall 26. Further, plural through holes 26C that allow the lower cooling space 101 and the lower gas flow path 111 to be communicated with each other are formed in a peripheral wall 26B of the partition wall 26. In the present embodiment, the upper end of the peripheral wall 26B of the partition wall 26 and the partition wall 14 are spaced apart from each other, so the lower cooling space 101 and the lower gas flow path 111 are also communicated with each other at that gap. In a case where the upper end of the peripheral wall 26B is brought close to or into contact with the partition wall 14, a cutaway (not shown in the drawings) may also be disposed in the upper end instead of the through holes 26C.

The outer cylinder member 121 fits into the inner side of the peripheral wall 41C of the lower case 41 at a lower portion 121A of a peripheral wall 121C. The lower portion 121A is configured to be larger in diameter than the peripheral wall 121C. A lower end portion 121D of the outer cylinder member 121 projects inward in the radial direction and is in contact with the bottom wall portion 41A of the lower case 41. That is, the lower end portion 121D of the outer cylinder member 121 is closed by the bottom wall portion 41A of the lower case 41.

The lower gas flow path 111 is communicated with the lower cooling space 101 via the through holes 26C in the peripheral wall 26B of the partition wall 26 and is communicated with the lower gas discharge holes 71. The lower gas flow path 111 is ensured by making the outer diameter of the peripheral wall 121C of the outer cylinder member 121 smaller than the inner diameter of the peripheral wall 41C of the lower case 41. The lower end side of the lower gas flow path 111 is closed by the lower portion 121A of the outer cylinder member 121.

In the present embodiment, because the partition wall 26 for disposing the lower cooling space 101 is present, the upper end portion 21B of the first inner cylinder member 21 does not reach the partition wall 14 but is positioned on the underside of the partition wall 26 (the bottom wall portion 41A side of the lower case 41).

In the present embodiment, in order to further reduce the weight, the first igniter 31 and the second igniter 32 are attached by resin molds 44 to the bottom wall portion 41A of the lower case 41.

Other portions are the same as those in the second embodiment, so for identical portions, identical reference signs are given in the drawings and description will be omitted.

(Operation)

The present embodiment is configured as described above, and the operation thereof will be described below. In FIG. 5, in the inflator 30 pertaining to the present embodiment, the gas generated in the lower combustion chamber 61 by the actuation of the first igniter 31 flows through the through holes 26A in the partition wall 26 and into the lower cooling space 101, further flows through the through holes 26C in the peripheral wall 26B of the partition wall 26 and into the lower gas flow path 111, and is discharged in the direction of arrow B to the outside of the inflator case 12 from the lower gas discharge holes 71.

At this time, the high-temperature, gas is cooled by heat exchange with the inflator case 12 through the outer cylinder member 121 and the partition wall 14. Further, the combustion residue included in the gas is efficiently removed before it reaches the lower gas discharge holes 71 because it adheres to wall portions and so forth of the lower cooling space 101 and the lower gas flow path 111 due to flow resistance when it passes through the lower cooling space 101 and the lower gas flow path 111. The "wall portions and so forth" are the partition wall 14, the partition wall 26, and the peripheral wall 26B, the peripheral wall 121C of the outer cylinder member 121, the peripheral wall 42L of the upper case 42, and the peripheral wall 41C of the lower case 41 facing the lower cooling space 101.

Because of this, a filter for cooling and filtration whose mass and volume are large (the lower filter 81 in the first embodiment and the second embodiment) can be done away with in regard to the lower combustion chamber 61, and it becomes possible to reduce the size and weight of the inflator 30. Further, because the resin molds 44 are used to attach the first igniter 31 and the second igniter 32 to the peripheral wall 41C of the lower case 41, it becomes possible to further reduce the weight.

The flow of the gas generated in the upper combustion chamber 62 is the same as in the second embodiment.

Embodiment of Airbag Device

Figure 7:
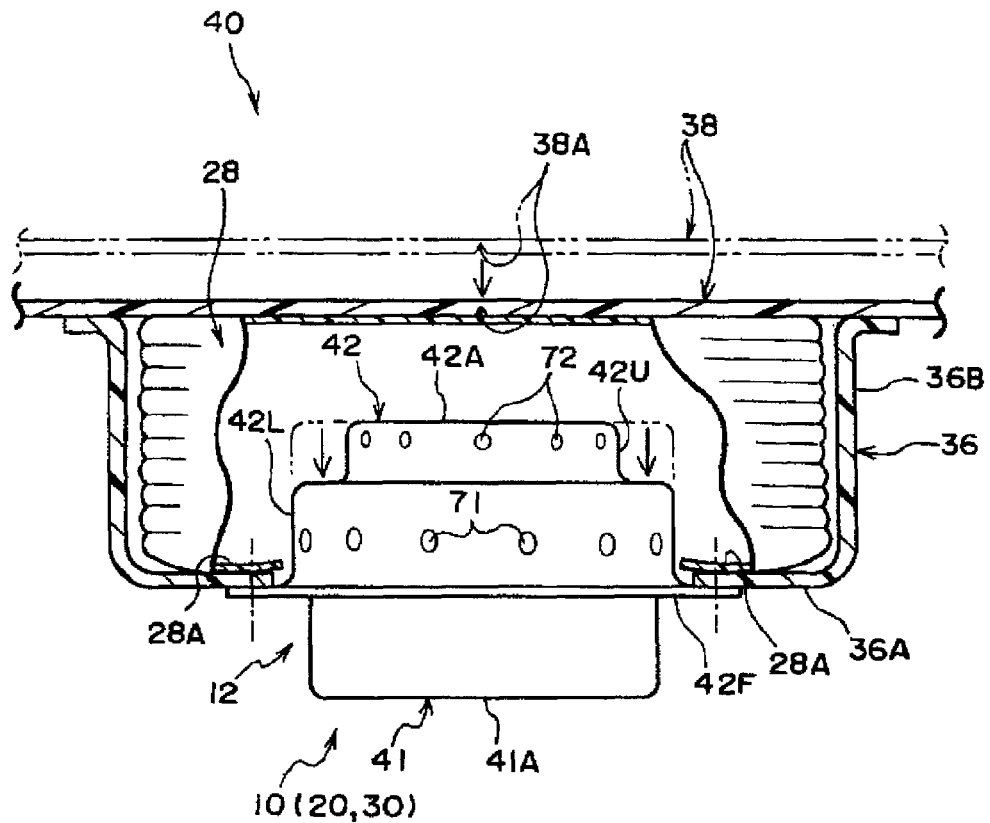
FIG. 7 is a longitudinal sectional view of main portions showing an embodiment of an airbag device.

In FIG. 7, the airbag device 40 is an airbag device for a passenger seat in a vehicle and has the inflator 10 pertaining to the first embodiment and an airbag 28.

The inflator 10 is attached to a bottom wall portion 36A of a module case 36 at the flange 42F of the upper case 42, and the upper case 42 is placed on a vehicle occupant 34 (FIG. 8) side. The upper gas discharge holes 72 and the lower gas discharge holes 71 are all positioned inside the airbag 28.

The airbag 28 is a bag body that is normally folded and stored inside the module case 36 and is supplied with the gas from the inflator 10 to thereby inflate and deploy in front of the vehicle occupant 34. A base portion 28A of the airbag 28 is fixed to the bottom wall portion 36A of the module case 36 together with the flange 42F of the inflator 10. The module case 36 is attached to the backside of an instrument panel 38 in front of the passenger seat. A planned rupture portion 38A that ruptures due to the inflation pressure of the airbag 28 is disposed in the instrument panel 38.

Figure 8:
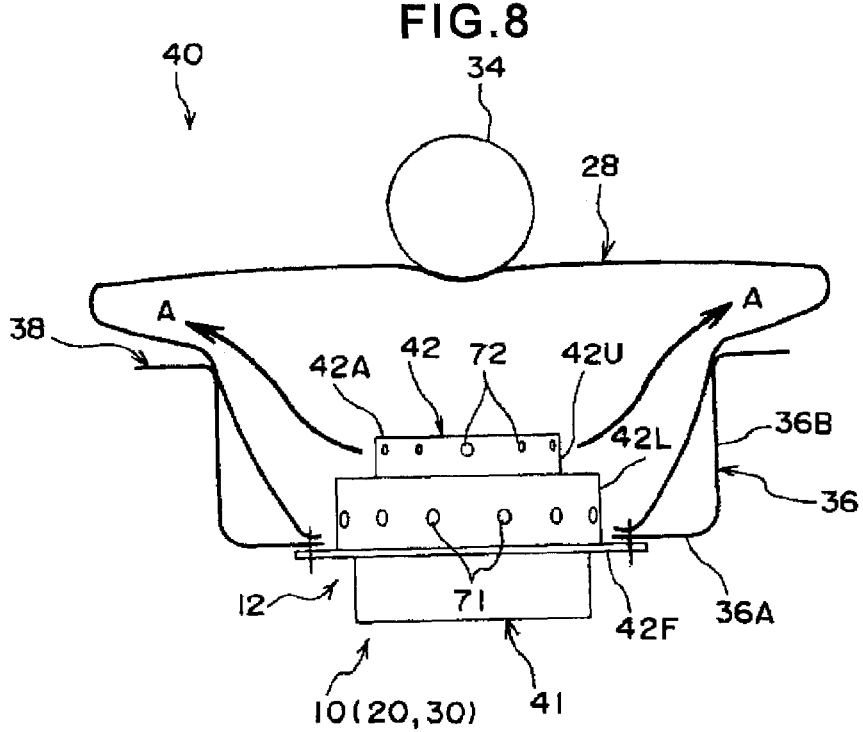
FIG. 8 is a sectional view showing an inflated and deployed state of an airbag in a state where a vehicle occupant is close.

As shown in FIG. 8, the airbag device 40 is configured in such a way that the second igniter 32 is actuated when the vehicle occupant 34 is in a state close to a storage position of the airbag 28. Here, the "storage position of the airbag 28" is, for example, the instrument panel 38 at the site where the module case 36 is placed. Further, the "close state" is a state where the vehicle occupant 34 is approaching the instrument panel 38 to an extent that the vehicle occupant 34 will end up coming into contact with the airbag 28 before the inflation and deployment of the airbag 28 is complete—that is, in the process of inflation and deployment.

The airbag device 40 is not limited to being for a passenger seat. Further, the inflator 20 pertaining to the second embodiment or the inflator 30 pertaining to the third embodiment may also be used as the inflator.

Other portions are the same as those in the first embodiment, so for identical portions, identical reference signs are given in the drawings and description will be omitted.

(Operation)

The present embodiment is configured as described above, and the operation thereof will be described below. In the inflator 10 used in the airbag device 40 pertaining to the present embodiment, as shown in FIG. 1, the outer diameter D2 of the site (the peripheral wall 42U of the upper case 42) of the inflator case 12 where the upper gas discharge holes 72 are formed is smaller than the outer diameter D1 of the site (the peripheral wall 42L of the upper case 42) of the inflator case 12 where the lower gas discharge holes 71 are formed. Consequently, as indicated by long dashed double-short dashed lines in FIG. 7, the capacity of the module case 36 can be increased more than in a case where the outer diameter of the peripheral wall 42U of the upper case 42 is equal to the outer diameter of the peripheral wall 42L.

Because of this, the folded height of the airbag 28 can be suppressed and the depth of the module case 36 can be reduced. Further, because of this, the relative position of the instrument panel 38 with respect to the inflator 10 can be changed from the position indicated by long dashed double-short dashed lines in FIG. 7 to the position indicated by solid lines, so that the instrument panel 38 and the inflator 10 can be brought closer together. Because of this, when the inflator 10 is actuated, the inflation pressure of the airbag 28 can be allowed to act efficiently with respect to the planned rupture portion 38A of the instrument panel 38.

Further, by making the outer diameter D2 of the peripheral wall 42U of the upper case 42 smaller than the outer diameter D1 of the peripheral wall 42L, more distance can be ensured from the upper gas discharge holes 72 to a side wall portion 36B of the module case 36.

Next, in FIG. 8, the operation of the airbag device 40 in a case where a vehicle collision has occurred when the vehicle occupant 34 is in the state close to the storage position (the instrument panel 38) of the airbag 34 will be described. In this case, the airbag ECU actuates the second igniter 32 of the inflator 10 to thereby generate gas in the relatively low-output upper combustion chamber 62 (see FIG. 1). The gas is discharged from the upper gas discharge holes 72 in the peripheral wall 42U of the upper case 42 and is supplied to the inside of the airbag 28. The instrument panel 38 ruptures at the planned rupture portion 38A (FIG. 7) due to the inflation pressure of the airbag 28. Because of this, the airbag 28 swells from the module case 36 toward the cabin side.

At this time, as described above, more distance is ensured from the upper gas discharge holes 72 to the side wall portion 36B of the module case 36, so the flow of the gas discharged from the upper gas discharge holes 72 is not impeded much by the side wall portion 36B. Moreover, as shown in FIG. 1, the upper gas discharge holes 72 are offset toward the bottom wall portion 42A side of the upper case 42 with respect to the central position C in the axial direction of the inflator case 12, so the gas generated in the upper combustion chamber 62 is discharged outward in the radial direction of the inflator case 12 (the direction of arrow A) from positions near the bottom wall portion 42A of the upper case 42. For this reason, it is easy to allow the airbag 28 to inflate and deploy in the radial direction thereof.

In addition to this, the upper combustion chamber 62 in the inflator 10 is set to a lower output than the lower combustion chamber 61, so the amount of swelling of the airbag 28 is suppressed and the load on the vehicle occupant 34 resulting from the airbag 28 can be alleviated.

Taking into consideration the disposal of the inflator 10, even in a case where the relatively low-output upper combustion chamber 62 has been used, it is to advisable to actuate the first igniter 31 at an appropriate timing unrelated to the restraint of the vehicle occupant 34 to thereby generate gas in the lower combustion chamber 61 and allow the gas to be fully discharged from the lower gas discharge holes 71.

Next, in FIG. 9, the operation of the airbag device 40 in a case where a vehicle collision has occurred when the vehicle occupant 34 is in a normal position—that is, not close to the storage position (the instrument panel 38) of the airbag 28—will be described. In this case, for example, the airbag ECU first actuates the first igniter 31 of the inflator 10 to thereby generate gas in the relatively high-output lower combustion chamber 61 and actuates the second igniter 32 to thereby also generate gas in the upper combustion chamber 62. The gas generated in the lower combustion chamber 61 is discharged outward in the radial direction of the inflator case 12 (in the direction of arrow B) from the lower gas discharge holes 72, and the gas generated in the upper combustion chamber 62 is discharged outward in the radial direction of the inflator case 12 (in the direction of arrow A) from the upper gas discharge holes 72. Because of this, the airbag 29 completely inflates and deploys. The vehicle occupant 34 can be appropriately restrained by the airbag 28. The airbag ECU may also first actuate the first igniter 31 and thereafter actuate the second igniter 32 or actuate the first igniter 31 and the second igniter 32 simultaneously.

Other Embodiments

An inflator from which only the upper filter 82 in the first embodiment is omitted is used for the second embodiment, and an inflator from which the upper filter 82 and the lower filter 81 are omitted is used for the third embodiment, but in addition to this it is also possible to give the inflator a structure from which only the lower filter 81 is omitted.

The upper combustion chamber 62 is set to a lower output than the lower combustion chamber 61, but the upper combustion chamber 62 is not limited to this and can also be conversely set to a higher output than the lower combustion chamber 61 or set to the same output as the lower combustion chamber 61.

The upper gas discharge holes 72 are offset toward the bottom wall portion 42A side of the upper case 42 with respect to the central position C of the upper combustion chamber 62 in the axial direction of the inflator case 12, but the position of the upper gas discharge holes 72 is not limited to this.

The outer diameter D2 of the site (the peripheral wall 42U of the upper case 42) of the peripheral wall of the inflator case 12 where the upper gas discharge holes 72 are formed is smaller than the outer diameter D1 of the site (the peripheral wall 42L of the upper case 42) of the peripheral wall of the inflator case 12 where the lower gas discharge holes 71 are formed, but the outer diameters are not limited to this and may also be configured such that D2=D1, for example.

EXPLANATION OF REFERENCE SIGNS

10 Inflator
12 Inflator Case
14 Partition Wall
20 Inflator
21 Inner Cylinder Member
21A Flash Holes
22 Inner Cylinder Member
22A Flash Holes
28 Airbag
30 Inflator
31 First Igniter
32 Second Igniter
34 Vehicle Occupant
40 Airbag Device
41 Lower Case
41A Bottom Wall Portion
42 Upper Case
42A Bottom Wall Portion
42B End Portion
42L Peripheral Wall
42U Peripheral Wall
51 Gas Generant
52 Gas Generant
61 Lower Combustion Chamber 62 Upper Combustion Chamber
71 Lower Gas Discharge Holes
72 Upper Gas Discharge Holes
91 Transfer Charge
92 Transfer Charge
101 Lower Cooling Space
102 Upper Cooling Space
111 Lower Gas Flow Path
112 Upper Gas Flow Path
C Central Position
D1 Outer Diameter of Site Where Lower Gas Discharge Holes Are Formed
D2 Outer Diameter of Site Where Upper Gas Discharge Holes Are Formed

The invention claimed is:

1. An inflator comprising:
   an inflator case that is configured from a bottomed cylindrical upper case and a bottomed cylindrical lower case that closes an opening in an end portion of the upper case, with the inflator case having an upper combustion chamber, in which a gas generant that generates gas by combustion is accommodated and which is positioned on the upper case side, and a lower combustion chamber, in which a gas generant that generates gas by combustion is accommodated and which is positioned on the lower case side, the upper combustion chamber and the lower combustion chamber being partitioned by a partition wall, and with the inflator case having a peripheral wall in which a plurality of upper gas discharge holes corresponding to the upper combustion chamber and a plurality of lower gas discharge holes corresponding to the lower combustion chamber are formed;
   a first inner cylinder member that is disposed on a bottom wall portion side of the lower case inside the inflator case, with flash holes communicated with the lower combustion chamber being formed in the first inner cylinder member, and with a transfer charge for combusting the gas generant inside the lower combustion chamber being accommodated inside the first inner cylinder member;
   a second inner cylinder member that is disposed on the bottom wall portion side of the lower case inside the inflator case, the second inner cylinder member having an upper end portion that penetrates the partition wall and is positioned in a lower portion of the upper combustion chamber, with flash holes communicated with the upper combustion chamber being formed in the upper end portion, and with a transfer charge for combusting the gas generant inside the upper combustion chamber being accommodated inside the second inner cylinder member;
   a first igniter that is disposed on the bottom wall portion side of the lower case and is configured to be capable of igniting the transfer charge inside the first inner cylinder member;
   a second igniter that is disposed on the bottom wall portion side of the lower case and is configured to be capable of igniting the transfer charge inside the second inner cylinder member; and
   a cylindrical heat-insulating material that is disposed on a radial direction outer side of the second inner cylinder member.

2. The inflator according to claim 1, wherein the inflator is provided with a configuration:
   that has an upper cooling space, which is disposed adjacent to the upper combustion chamber on the inner side of the inflator case and is communicated with the upper combustion chamber, and an upper gas flow path, which is communicated with the upper cooling space and is communicated with the upper gas discharge holes, and
   that does not use a filter for cooling and filtration with respect to the gas generated inside the upper combustion chamber.

3. The inflator according to claim 1, wherein the inflator is provided with a configuration:
   that has a lower cooling space, which is disposed adjacent to the lower combustion chamber on the inner side of the inflator case and is communicated with the lower combustion chamber, and a lower gas flow path, which is communicated with the lower cooling space and is communicated with the lower gas discharge holes, and
   that does not use a filter for cooling and filtration with respect to the gas generated inside the lower combustion chamber.

4. The inflator according to claim 1, wherein the upper combustion chamber is set to a lower output than the lower combustion chamber.

5. The inflator according to claim 4, wherein the upper gas discharge holes are offset toward the bottom wall portion side of the upper case with respect to a central position of the upper combustion chamber in an axial direction of the inflator case.

6. The inflator according to claim 4, wherein the outer diameter of the site of the peripheral wall of the inflator case where the upper gas discharge holes are formed is smaller than the outer diameter of the site of the peripheral wall of the inflator case where the lower gas discharge holes are formed.

7. An airbag device comprising:
   the inflator according to claim 4 where the upper case is placed on a vehicle occupant side; and
   an airbag that is normally folded and stored and is supplied with the gas from the inflator to thereby inflate and deploy in front of the vehicle occupant,
   wherein the second igniter is actuated when the vehicle occupant is in a state close to a storage position of the airbag.

* * * * *